(12) United States Patent
Lin et al.

(10) Patent No.: US 9,762,123 B1
(45) Date of Patent: Sep. 12, 2017

(54) BOOST CONVERTER CIRCUIT ABLE TO SENSE CURRENT

(71) Applicant: SEA SONIC ELECTRONICS CO., LTD., Taipei (TW)

(72) Inventors: Pao-Tsun Lin, Taipei (TW); Ten-Chun Chen, Taipei (TW)

(73) Assignee: SEA SONIC ELECTRONICS CO., LTD., Taipei (TW)

( * ) Notice: Subject to any disclaimer, the term of this patent is extended or adjusted under 35 U.S.C. 154(b) by 0 days.

(21) Appl. No.: 15/249,822

(22) Filed: Aug. 29, 2016

(51) Int. Cl.
*H02M 3/156* (2006.01)
*H02M 1/00* (2006.01)

(52) U.S. Cl.
CPC .... *H02M 3/156* (2013.01); *H02M 2001/0009* (2013.01)

(58) Field of Classification Search
CPC ....... H02M 2001/0009; H02M 1/4225; H02M 2003/1552; H02M 3/156
See application file for complete search history.

(56) References Cited

U.S. PATENT DOCUMENTS

| | | | | |
|---|---|---|---|---|
| 5,001,413 A * | 3/1991 | Ohms | ................... | H02M 3/156 323/242 |
| 6,014,326 A * | 1/2000 | Koch | ................... | H02M 3/337 363/132 |
| 6,204,630 B1 * | 3/2001 | James | ................... | H02J 7/022 320/104 |
| 7,876,191 B2 * | 1/2011 | Chandrasekaran | ....... | H01F 3/14 336/212 |
| 9,325,235 B2 | 4/2016 | Pahlevaninezhad et al. | | |
| 9,379,621 B1 * | 6/2016 | Kalyanaranman | ......................... | H02M 3/33507 |
| 9,667,136 B1 * | 5/2017 | Lin | ..................... | H02M 1/4208 |
| 2006/0103359 A1 * | 5/2006 | Watanabe | ........... | H02M 3/1582 323/225 |
| 2010/0259957 A1 * | 10/2010 | Jin | ...................... | H02M 1/4208 363/126 |
| 2015/0002128 A1 * | 1/2015 | Cho | ....................... | H02M 3/156 323/311 |
| 2015/0061530 A1 * | 3/2015 | Kang | ................. | H05B 33/0815 315/221 |
| 2015/0291088 A1 * | 10/2015 | Ueno | ...................... | H02M 7/48 315/77 |
| 2016/0028304 A1 * | 1/2016 | O'Day | ................ | H02M 1/4225 363/89 |

* cited by examiner

*Primary Examiner* — Fred E Finch, III
(74) *Attorney, Agent, or Firm* — Muncy, Geissler, Olds & Lowe, P.C.

(57) ABSTRACT

A boost converter circuit able to sense current comprises an inductor connected with a power source; an active switch; a passive switch; a capacitor connected with one end of the passive switch, which is not connected with the active switch; a center-tapped current transformation element; and a signal rectification unit. The center-tapped current transformation element includes a primary winding and a secondary winding. Two ends of the primary winding are respectively connected with the active switch and the passive switch. The primary winding is connected with the inductor through a tapped terminal. The secondary winding is magnetically induced by the primary winding to generate a magnetic induction signal while the primary winding receives an inductor current. The signal rectification unit is connected with the secondary winding, receiving the magnetic induction signal and rectifying the magnetic induction signal to generate a sensed current signal corresponding to the inductor current.

11 Claims, 6 Drawing Sheets

BOOST CONVERTER CIRCUIT ABLE TO SENSE CURRENT

FIELD OF THE INVENTION

The present invention relates to a boost converter circuit, particularly to a boost converter circuit including a center-tapped current transformation element to sense the inductor current.

BACKGROUND OF THE INVENTION

With development of electronic industry, many circuits demand stable controllability in addition to their original functions. For example, in order to determine the current of the inductor inside a boost converter circuit, some related professionals in the art cascade a Hall device to the inductor to measure the inductor current. However, the Hall device normally has larger volume and occupies more layout space, which is unfavorable to the present requirement of miniaturizing electronic devices. Besides, the Hall device is more expensive and would raise the cost of the circuit.

A U.S. Pat. No. 9,325,235 disclosed another technology. From FIG. 4 of the specification of the patent, it is learned: a current transformation element is cascaded to one end of an active switch, which is adjacent to an inductor, to sense the current. However, the active switch of a boost converter circuit is controlled by a driving signal to turn on or off. While the active switch is turned on, the related loop is in a connection state, allowing the current to normally flow through the current transformation element and enabling the current transformation element to acquire a sensation signal. While the active switch is turned off, the related loop is in a disconnection state, prohibiting the current from flowing through the current transformation element and disabling the current transformation element from acquiring the sensation signal. Thus, the current transformation element cannot sense the complete inductor current but can only sense the current while the active switch is turned on.

SUMMARY OF THE INVENTION

The primary objective of the present invention is to solve the problem: the conventional technology needs a bulky Hall device to fully sense the inductor current, and the problem: the Hall device increases the cost and limits the layout of electronic elements.

Another objective of the present invention is to solve the problem: the turning on/off of an active switch makes the current transformation element, which is cascaded to the active switch, unable to fully sensing the inductor current.

In order to achieve the abovementioned objectives, the present invention proposes a boost converter circuit able to sense current, which comprises an inductor connected with the power source; an active switch; a passive switch connected with the active switch; a capacitor connected with one end of the passive switch, which is not connected with the active switch; a center-tapped current transformation element; and a signal rectification unit connected with the center-tapped current transformation element. The center-tapped current transformation element includes a primary winding and a secondary winding. Two ends of the primary winding are respectively connected with the active switch and the passive switch. The primary winding is connected with the inductor through a tapped terminal. The secondary winding is magnetically induced by the primary winding to generate a magnetic induction signal while the primary winding receives an inductor current. The signal rectification unit is connected with the secondary winding, receiving the magnetic induction signal and rectifying the magnetic induction signal to generate a sensed current signal corresponding to the inductor current.

In one embodiment, the signal rectification unit is of a half-wave rectifier architecture or a full-wave rectifier architecture.

In one embodiment, the power source is a direct-current power source.

In one embodiment, the power source is an alternating-current power source, and the boost converter circuit further comprises a full-bridge rectification unit disposed between and connected with the power source and the inductor.

In one embodiment, the passive switch includes a forward-conduction terminal connected with the center-tapped current transformation element and a reverse-disconnection terminal connected with the capacitor.

In one embodiment, the boost converter circuit further comprises a conversion resistor disposed between the center-tapped current transformation element and the signal rectification unit, and connected with the secondary winding in parallel.

In one embodiment, the boost converter circuit further comprises a voltage regulation resistor connected with the signal rectification unit and receiving the sensed current signal.

In one embodiment, the active switch is a bipolar junction transistor (BJT), a metal-oxide-semiconductor field-effect transistor (MOSFET), or an insulated gate bipolar transistor (IGBT).

In comparison with the conventional technology, the present invention is characterized in including a center-tapped current transformation element disposed among the inductor, the active switch, and the passive switch. The center-tapped current transformation element can always receive the inductor current no matter whether the active switch is turned on or turned off and thus can always generate the magnetic induction signal. The magnetic induction signal is rectified into the sensed current signal corresponding to the inductor current. Therefore, the engineers can learn the variation of the inductor current according to the sensed current signal. Besides, the present invention using the center-tapped current transformation element is exempted from the problem of bulky volume and high cost occurring in the conventional technology using the Hall device.

DETAILED DESCRIPTION OF THE PREFERRED EMBODIMENTS

The technical contents of the present invention will be described in detail in cooperation with drawings below.

Figure 1:
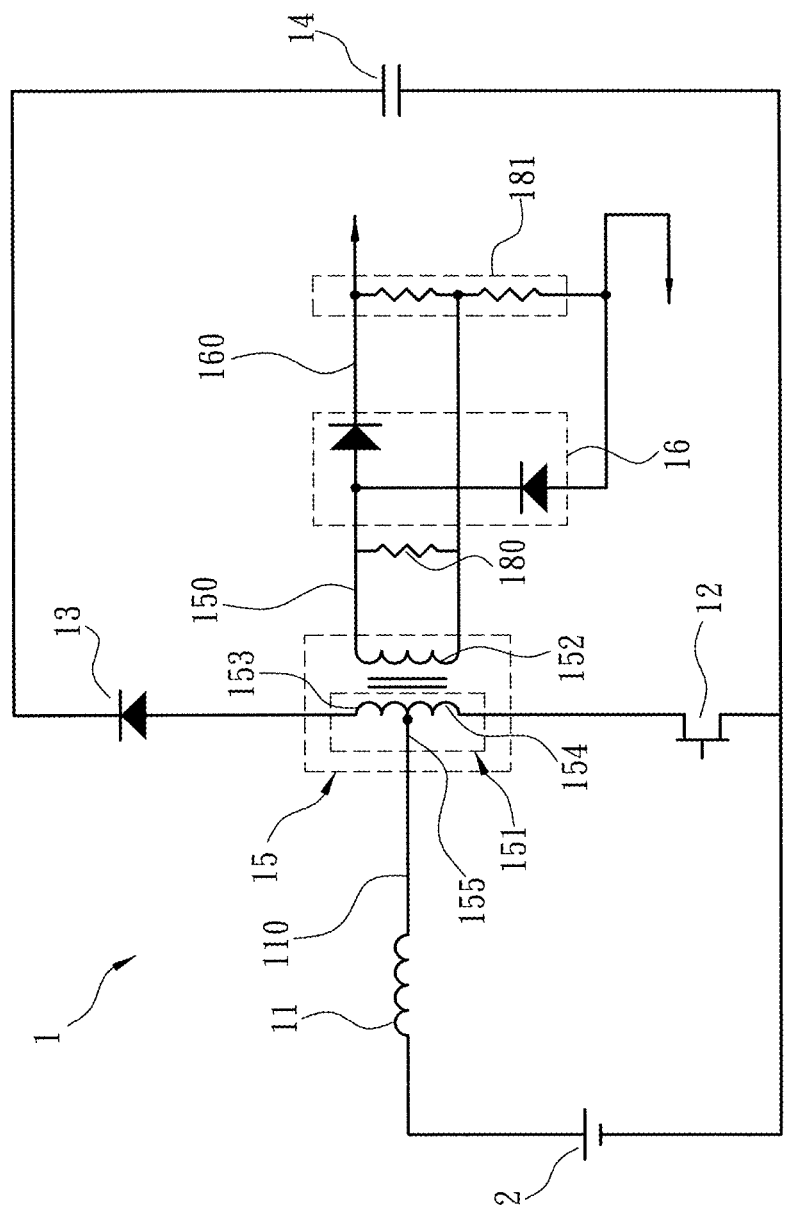
FIG. 1 is a diagram schematically showing a boost converter circuit according to a first embodiment of the present invention.

Refer to FIG. 1. The present invention provides a boost converter circuit 1 able to sense current. The boost converter circuit 1 is connected with a power source 2 to acquire a working power from the power source 2 and boost the working power. Herein, a direct-current (DC) power source is used as the power source 2 to demonstrate the present invention. However, the present invention is not limited to the case of using a DC power source as the power source 2. In one embodiment, the boost converter circuit 1 comprises an inductor 11 connected with the power source 2; an active switch 12; a passive switch 13 connected with the active switch 12; a capacitor 14 connected with one end of the passive switch 13, which is not connected with the active switch 12; a center-tapped current transformation element 15; and a signal rectification unit 16. While the working power is input into the boost converter circuit 1, the inductor 11 generates an inductor current 110. In one embodiment, the active switch 12 is a bipolar junction transistor (BJT), a metal-oxide-semiconductor field-effect transistor (MOSFET), or an insulated gate bipolar transistor (IGBT). The active switch 12 receives a driving signal from a driving unit (not shown in the drawing), controlled by the driving signal to switch between the turned-on state and the turned-off state. The boost converter circuit 1 determines the extent of boost conversion of the working power according to the duty cycle of the driving signal. The passive switch 13 is a diode, including a forward-conduction terminal 131 connected with the center-tapped current transformation element 15 and a reverse-disconnection terminal 132 connected with the capacitor 14.

Figure 2:
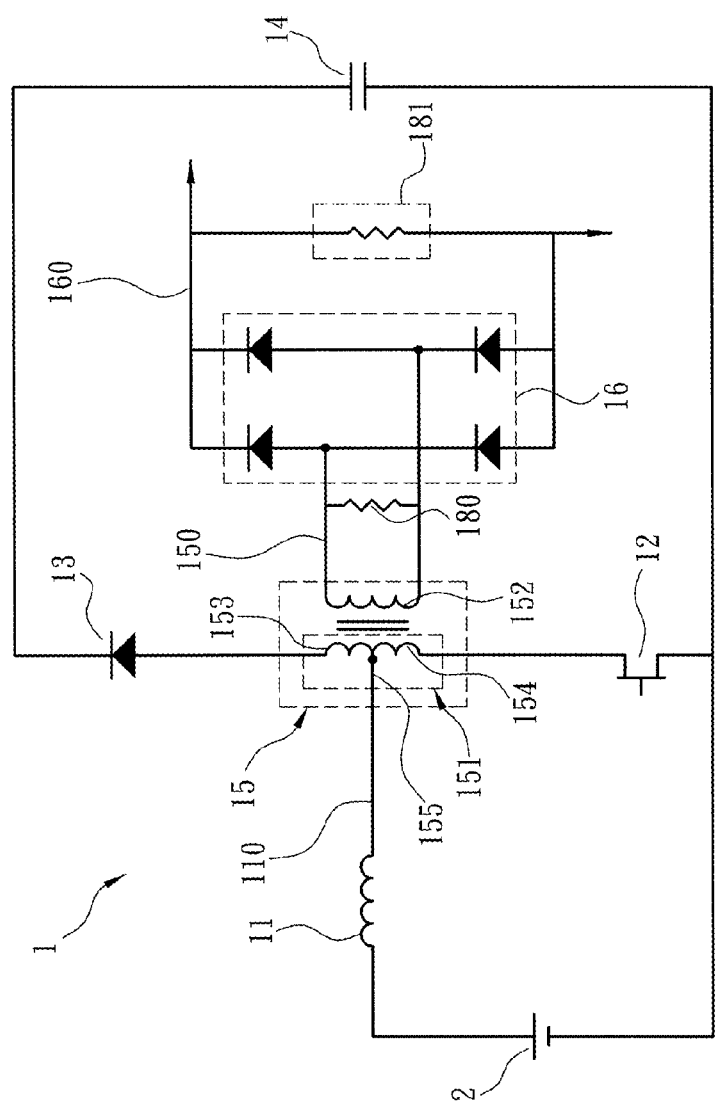
FIG. 2 is a diagram schematically showing a boost converter circuit according to a second embodiment of the present invention.

The center-tapped current transformation element 15 includes a primary winding 151 and a secondary winding 152. The primary winding 151 further includes a first sub-winding 153, a second sub-winding 154, and a tapped terminal 155 connected with the first sub-winding 153 and the second sub-winding 154. The center-tapped current transformation element 15 is connected with the inductor 11, the active switch 12 and the passive switch 13 through the primary winding 151. In detail, the first sub-winding 153 of the primary winding 151 is connected with the passive switch 13; the second sub-winding 154 is connected with the active switch 12; the tapped terminal 155 is connected with the inductor 11. While the primary winding 151 receives the inductor current 110, the secondary winding 152 is magnetically induced by the primary winding 151 and generates a magnetic induction signal 150. The signal rectification unit 16 is connected with the secondary winding 152, receiving the magnetic induction signal 150 and rectifying the magnetic induction signal 150 to generate a sensed current signal 160 corresponding to the inductor current 110. The signal rectification unit 16 is of a half-wave rectifier architecture or a full-wave rectifier architecture. The boost converter circuit 1 using the half-wave rectifier architecture is exactly the circuit shown in FIG. 1, and the boost converter circuit 1 using the full-wave rectifier architecture is shown FIG. 2.

The principle of the boost converter circuit 1 of the present invention is a conventional technology well known to the persons skilled in the art and will not repeat herein.

While the boost converter circuit 1 of the present invention is powered, the active switch 12 is controlled by the driving signal to switch between the turned-on state and the turned-off state. While the active switch 12 is turned on, the inductor current 110 passes through the second sub-winding 154 of the primary winding 151 and then flows to the active switch 12. At this time, the second sub-winding 154, which the inductor current 110 flows through, induces the secondary winding 152 magnetically and makes the secondary winding 152 generate the magnetic induction signal 150. While the active switch 12 is turned off, the related branch circuits of the active switch 12 are all electrically disconnected, and the inductor current 110 flows through the first sub-winding 153 to the passive switch 13. At this time, the first sub-winding 153, which the inductor current 110 flows through, magnetically induces the secondary winding 152 and makes the secondary winding 152 generate the magnetic induction signal 150. Therefore, no matter whether the active switch 12 is turned on or off, the center-tapped current transformation element 15 can always generate the magnetic induction signal 150 to fully present the continuous variation of the inductor current 110.

Figure 3:
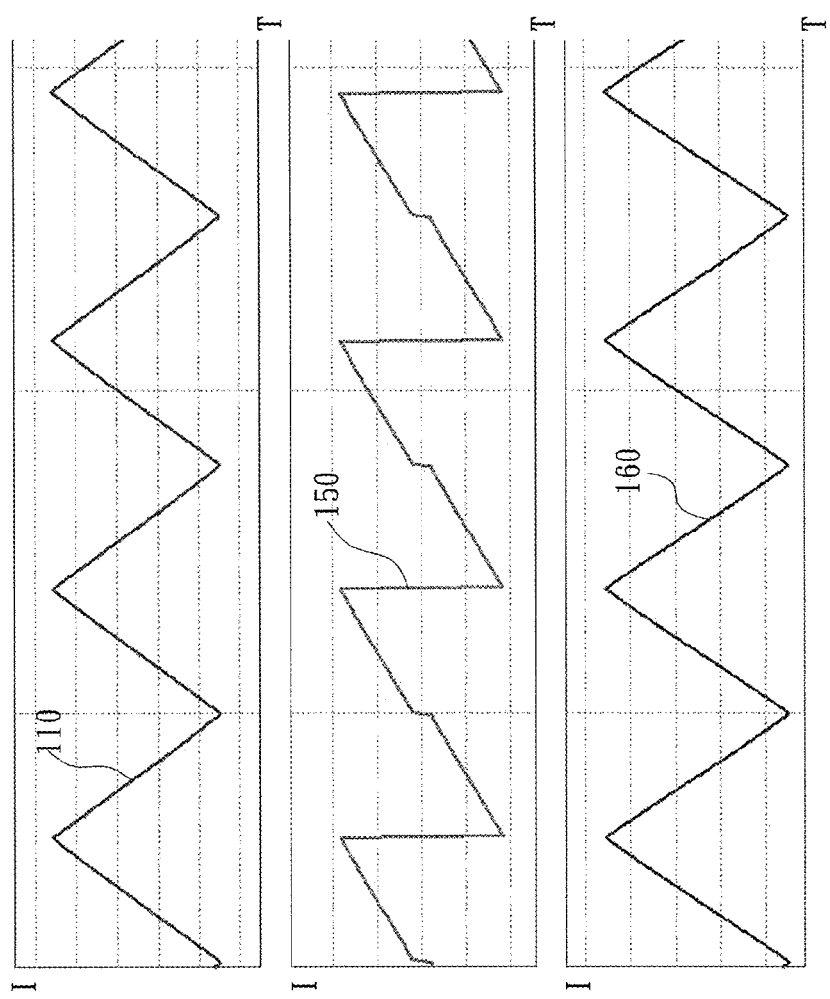
FIG. 3 is a diagram showing waveforms in a circuit simulation of a boost converter circuit according to the first embodiment of the present invention.

While the circuit shown in FIG. 1 is used in a circuit simulation, the waveforms of the inductor current 110, the magnetic induction signal 150, and the sensed current signal 160 are shown in FIG. 3. From FIG. 3, it is learned: the waveform of the sensed current signal 160 is identical to that of the inductor current 110. Therefore, the sensed current signal 160 can be used to learn the related parameters of the inductor current 110.

Figure 4:
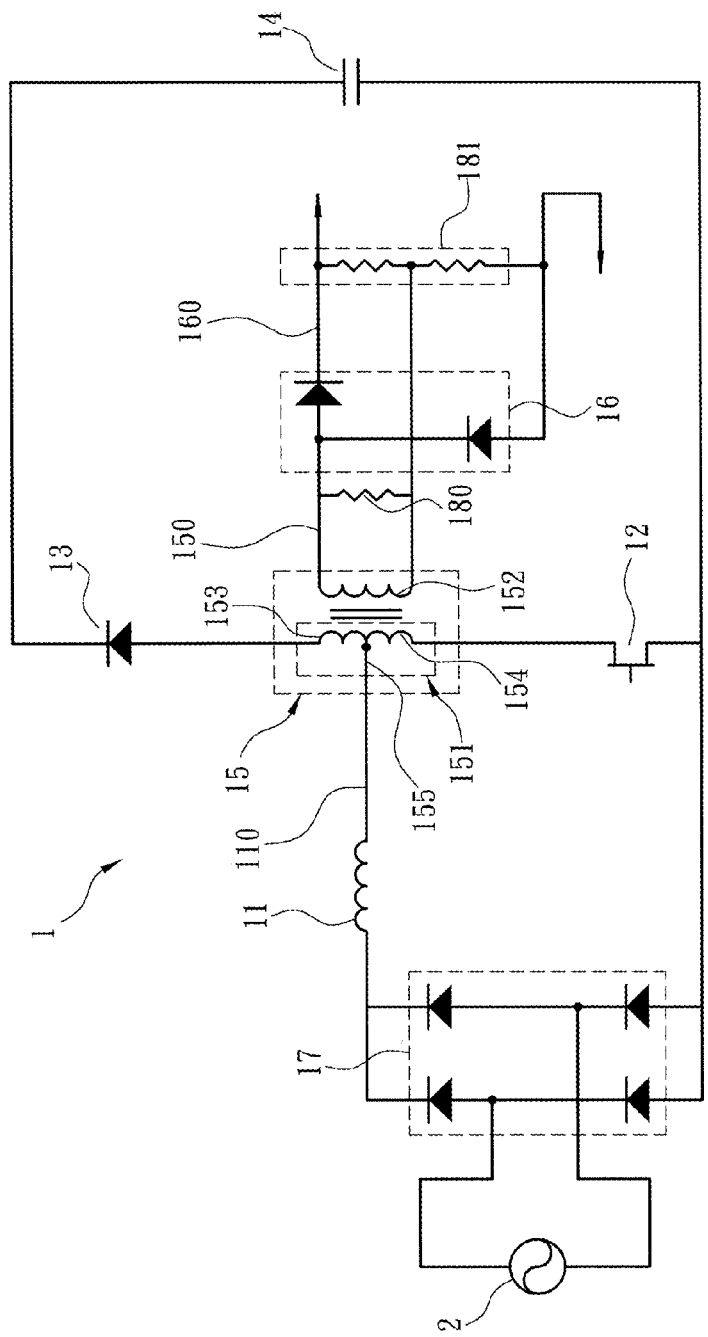
FIG. 4 is a diagram schematically showing a boost converter circuit according to a third embodiment of the present invention.
Figure 5:
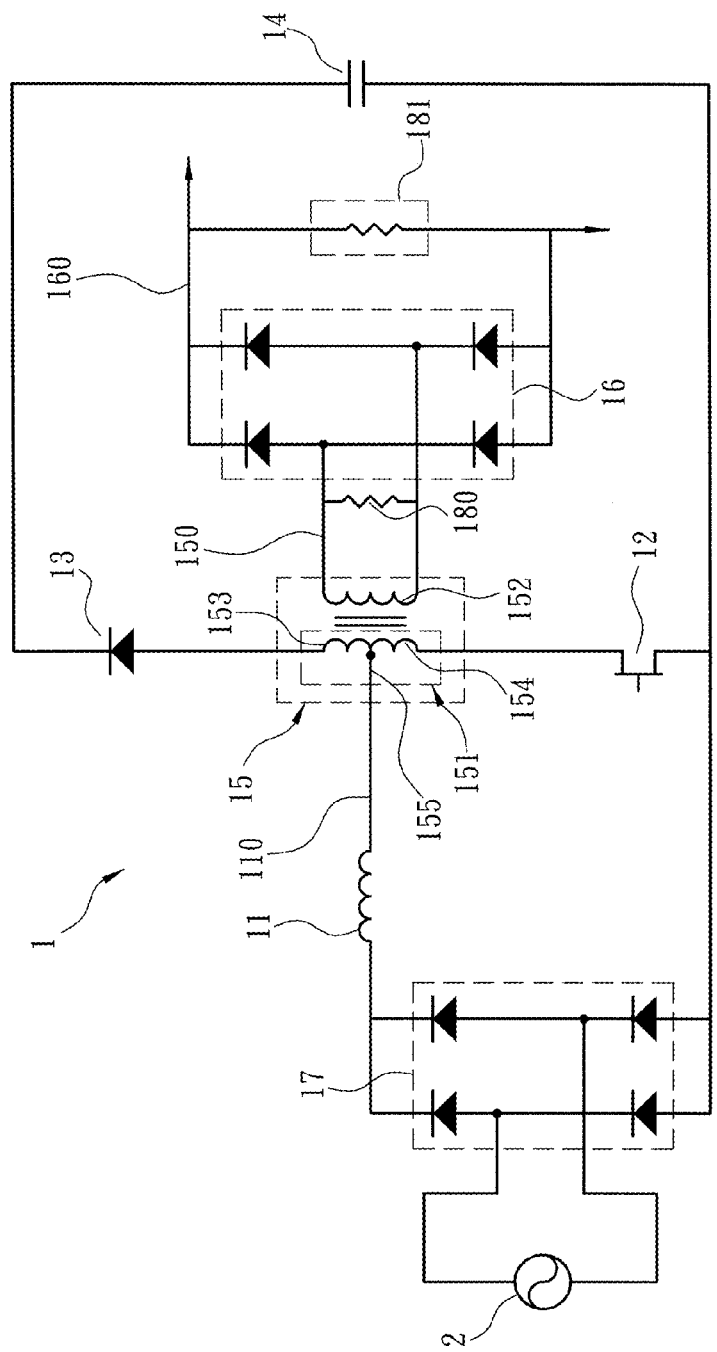
FIG. 5 is a diagram schematically showing a boost converter circuit according to a fourth embodiment of the present invention.
Figure 6:
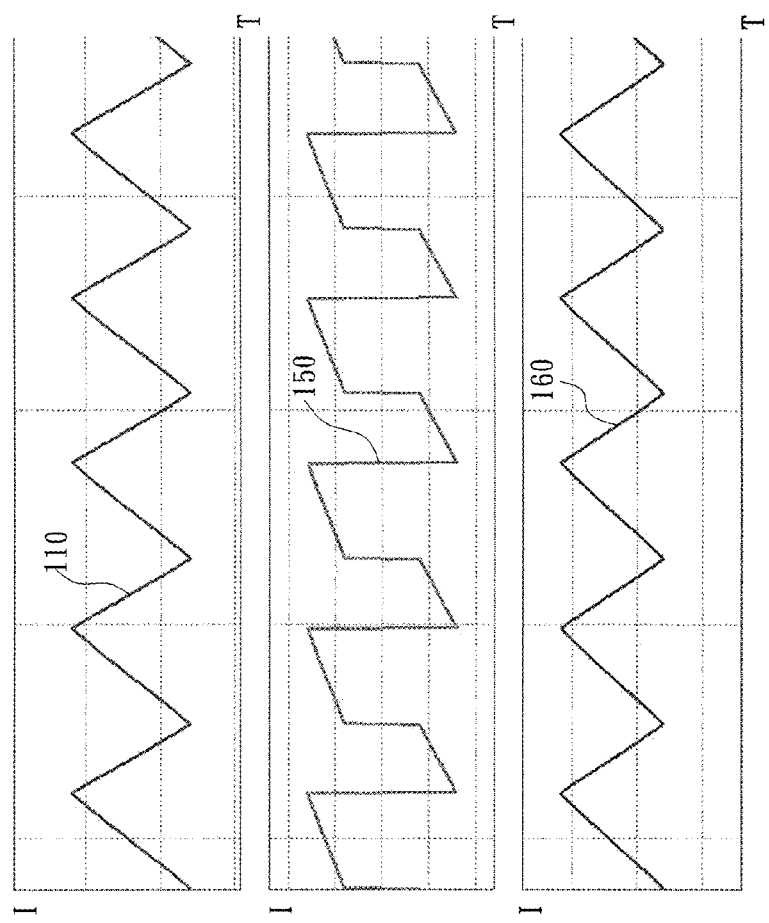
FIG. 6 is a diagram showing waveforms in a circuit simulation of a boost converter circuit according to the second embodiment of the present invention.

Refer to FIG. 4. In one embodiment, an alternating-current (AC) power source is used as the power source 2. In this embodiment, the boost converter circuit 1 further comprises a full-bridge rectification unit 17 disposed between and connected with the power source 2 and the inductor 11. The full-bridge rectification unit 17 can convert the AC power, which is supplied by the power source 2, into a DC power for the succeeding circuit. The operation of this embodiment is similar to that of the abovementioned embodiment and will not repeat herein. The signal rectification unit 16 in the boost converter circuit 1 shown in FIG. 4 can be realized with a half-wave rectifier architecture or a full-wave rectifier architecture. The boost converter circuit 1 using the half-wave rectifier architecture is exactly the circuit shown in FIG. 4, and the boost converter circuit 1 using the full-wave rectifier architecture is shown FIG. 5. While the circuit shown in FIG. 4 is used in a circuit simulation, the waveforms of the inductor current 110, the magnetic induction signal 150, and the sensed current signal 160 are shown in FIG. 6. From FIG. 6, it is learned: the waveform of the sensed current signal 160 is identical to that of the inductor current 110. Therefore, the sensed current signal 160 can be used to understand the inductor current 110.

Refer to FIG. 1 and FIG. 2 again. In one embodiment, the boost converter circuit 1 further comprises a conversion resistor 180 disposed between the center-tapped current transformation element 15 and the signal rectification unit 16 and connected with the secondary winding 152 in parallel. The conversion resistor 180 changes the characteristics of the magnetic induction signal 150 to make the current of the magnetic induction signal 150 become apparent, whereby the magnetic induction signal 150 can be used by the signal rectification unit 16 reliably. Further, the signal rectification unit 16 can outputs the sensed current signal 160 to a microcontroller. In order to make the voltage of the sensed current signal 160 match the microcontroller, the boost converter circuit 1 further comprises a voltage regulation resistor 181 connected with the signal rectification unit 16 and receiving the sensed current signal 160.

The present invention has been demonstrated in detail with the embodiments. However, these embodiments are only to exemplify the present invention but not to limit the scope of the present invention. Any equivalent modification or variation according to the spirit of the present invention is to be also included within the scope of the present invention.

What is claimed is:

1. A boost converter circuit able to sense current, comprising
    an inductor connected with a power source;
    an active switch;
    a passive switch connected with the active switch;
    a capacitor connected with one end of the passive switch, which is not connected with the active switch;
    a center-tapped current transformation element including a primary winding and a secondary winding, wherein two ends of the primary winding are respectively connected with the active switch and the passive switch, and wherein the primary winding is connected with the inductor through a tapped terminal, and wherein the secondary winding is magnetically induced by the primary winding to generate a magnetic induction signal while the primary winding receives an inductor current; and
    a signal rectification unit connected with the secondary winding, receiving the magnetic induction signal (150) and rectifying the magnetic induction signal to generate a sensed current signal corresponding to the inductor current.

2. The boost converter circuit able to sense current according to claim 1, wherein the signal rectification unit is of a half-wave rectifier architecture or a full-wave rectifier architecture.

3. The boost converter circuit able to sense current according to claim 2, wherein the power source is a direct-current power source.

4. The boost converter circuit able to sense current according to claim 2 further comprising a conversion resistor disposed between the center-tapped current transformation element and the signal rectification unit and connected with the secondary winding in parallel.

5. The boost converter circuit able to sense current according to claim 4 further comprising a voltage regulation resistor connected with the signal rectification unit and receiving the sensed current signal.

6. The boost converter circuit able to sense current according to claim 1, wherein the power source is an alternating-current power source, and wherein the boost converter circuit further comprises a full-bridge rectification unit disposed between and connected with the power source and the inductor.

7. The boost converter circuit able to sense current according to claim 6, wherein the passive switch includes a forward-conduction terminal connected with the center-tapped current transformation element and a reverse-disconnection terminal connected with the capacitor.

8. The boost converter circuit able to sense current according to claim 1, wherein the passive switch includes a forward-conduction terminal connected with the center-tapped current transformation element and a reverse-disconnection terminal connected with the capacitor.

9. The boost converter circuit able to sense current according to claim 1 further comprising a conversion resistor disposed between the center-tapped current transformation element and the signal rectification unit and connected with the secondary winding in parallel.

10. The boost converter circuit able to sense current according to claim 9 further comprising a voltage regulation resistor connected with the signal rectification unit and receiving the sensed current signal.

11. The boost converter circuit able to sense current according to claim 1, wherein the active switch is a bipolar junction transistor (BJT), a metal-oxide-semiconductor field-effect transistor (MOSFET), or an insulated gate bipolar transistor (IGBT).

* * * * *